United States Patent [19]

Huang

[11] Patent Number: 4,880,385
[45] Date of Patent: Nov. 14, 1989

[54] FULLY AUTOMATIC SPEED-READING TRAINER

[76] Inventor: Yi-Chao Huang, 16, Chia-Shui 1st Tsun, Chia Yi, Taiwan

[21] Appl. No.: 131,736

[22] Filed: Dec. 11, 1987

[51] Int. Cl.$^4$ .................... G09B 17/02; G09B 17/04
[52] U.S. Cl. ................................. 434/181; 434/183; 40/352
[58] Field of Search ............... 434/179, 181, 180, 183, 434/85; 40/352, 353, 355, 357, 466, 904

[56] References Cited

U.S. PATENT DOCUMENTS

| | | | |
|---|---|---|---|
| 3,400,473 | 9/1968 | Nunn, Jr. | 434/181 |
| 3,698,103 | 10/1972 | Harmon | 434/183 |
| 3,721,021 | 3/1973 | Stewart et al. | 434/183 |

Primary Examiner—Edward M. Coven
Assistant Examiner—Valerie Szczepanik
Attorney, Agent, or Firm—Sandler & Greenblum

[57] ABSTRACT

A fully automatic speed-reading trainer for which reading speed can be adjusted in a non-step fashion is provided which includes an electric motor designed to drive a relatively large gear, which is one main component of a driving assembly forming a portion of the trainer. Coaxial with the larger gear, on opposite sides thereof, are an eccentric cam and a first pulley. The eccentric cam and pulley are each provided with an axle tube, and each has a coil spring attached thereto, with each coil spring having a free end inserted into respective holes on the larger gear. When the larger gear is rotatably driven in a predetermined direction, one of the springs is tightened about one of the axle tubes, which in turn, dependent upon the rotational direction of the larger gear, drives either the eccentric cam or the first pulley. This driving assembly thereby actuates an advancement assembly, which generates intermittent movement on a pressing board which is driven in a time sequence over predetermined distances to provide viewing of text on pages of a book through a viewing window which is transversely connected to one end of the pressing board. When the driving unit is driven to rotate in a reverse direction, the advancement mechanism quickly retracts to begin a new advancement cycle. The recycling operation is thereby automatically conducted by the trainer.

35 Claims, 5 Drawing Sheets

FULLY AUTOMATIC SPEED-READING TRAINER

BACKGROUND OF THE DISCLOSURE

1. Technical Field of the Invention

The present invention generally relates to a speed-reading trainer, and more specifically relates to continuous and fully automatic speed-reading trainers in which the lines of text on the page of a book can be automatically displayed during speed-reading training and in which reading speed can be adjusted in a continuous, non-step fashion. The trainer can be used with any book and can provide a predetermined movement speed, text lines, and page spacing in order to track and arouse the attention of a trainee. In this fashion, the reading speed of a trainee can be greatly increased by using this trainer and can increase the knowledge of the user by promoting absorption of knowledge from the reading material. Effectively, therefore, the speed-reading trainer of the present invention can improve knowledge acquisition and can make reading more efficient in a simultaneous fashion.

2. Discussion of Relevant Information

Previously, it has not been possible to teach speed-reading techniques which improved both the speed of reading as well as the efficiency and comprehension of reading in a fully automatic fashion.

SUMMARY OF THE INVENTION

One of the objects of the present invention is to provide a new and improved fully automatic speed-reading trainer in which the text lines on pages of reading material can be automatically displayed during speed-reading training.

Another object of the present invention is to provide a fully automatic speed-reading trainer which can be used with any book and which can be provided with a predetermined movement speed for text and page spacing.

A yet further object of the present invention is to provide a fully automatic speed-reading trainer which will increase the reading speed and comprehension of a trainee.

The above and other objects, features and advantages of the present invention will be attained in a first aspect of the present invention by a fully automatic speed-reading trainer which comprises a housing having at least two opposed frames, a first, left-hand frame, and a second, right-hand frame. A control circuit assembly is mounted on said first frame, as are a plurality of magnetic switches.

A battery compartment is positioned within said second frame, and a driving assembly, an advancement assembly, and an advancement adjustment assembly are provided, wherein said driving assembly comprises means for rotating said advancement assembly to drive a viewing window attached to the housing in a generally linear fashion.

The magnetic switches comprise magnetic reed switches, and the driving assembly comprises an electric motor, a driving, i.e., active gear rotatably driven by said electric motor, and a second, larger gear mounted on a first axle and adapted to be driven by said active gear. The trainer also includes an eccentric cam and a first pulley attached to said axle on opposite sides of said larger gear, wherein each of said eccentric cam and said pulley comprise an axle tube adapted to fit over respective ends of the axle.

The speed-reading trainer further comprises first and second coiled springs mounted over respective ones of said axle tubes, each of said coil springs having a free end adapted to be inserted into respective holes located on a flat surface of said larger gear; and when larger gear is rotatably driven in either a clockwise or counterclockwise direction, at least one of said eccentric cam or pulley will be rotatably driven by the tightening action of one of said springs. A rocker arm is positioned adjacent to and attached to said eccentric cam, wherein rotary movement of said eccentric cam is transformed into reciprocating motion by said rocker arm, wherein said rocker arm comprises means for generating reciprocating movement to drive said advancement assembly to rotate in a clockwise direction, wherein said pulley comprises means for driving said advancement mechanism to rotate in a counterclockwise direction.

The speed-reading trainer further comprises a connecting arm for attaching said driving assembly and said advancement assembly to each other, said connecting arm comprising a pivot at one end which is mounted in a pivot hole on said rocker arm, said connecting arm further comprising a pi hole at a second end thereof, said pin hole adapted to be mounted on a pin extending toward said first plate from a driving disk forming a portion of said advancement assembly, wherein reciprocating motion of said rocker arm comprises means for driving said driving disk, and a coaxial rotary cup having a central aperture, to swing with a predetermined angular amplitude.

The advancement mechanism further comprises a coil spring and a steel ball biased by said coil spring which is adapted to selectively engage a cam which is attached to a generally transversely extending axle on a forcing disk positioned between said rotary cup and said driving disk, said spring-loaded steel ball comprising means for transforming said swinging motion of said rotary cup into an intermittent single directional motion, said single directional motion being adapted to drive a third gear which is attached to and coaxial with said rotary cup, said cam, said forcing disk and said driving disk, intermittently, in a single direction.

The first frame comprises an elongated slot, an adjustment bolt being positioned substantially parallel to a flat surface of said frame member and parallel to said slot, said advancement adjustment assembly further comprising a head having a pin extending from one end thereof and a central aperture. The adjustment bolt is adapted to be inserted through said aperture, wherein said adjustment bolt, when rotated, comprises means for changing the position of the head within said slot and for changing the position of said connecting arm in a slot on an arcuate guide slot plate, thereby comprising means for changing the advancement distance of said viewing window, said window being attached to said advancement mechanism.

The speed-reading trainer further comprises a pressing board having a guide rail, said pressing board having a spline which is adapted to be driven by rotation of said third gear. A cover plate having a central viewing window is transversely connected to one end of said pressing board and adapted to cover one or more lines of text in a book, wherein rotation of said third gear comprises means for driving said pressing board to advance said window over a predetermined distance of said text.

The driving assembly is adapted to be rotated in either a clockwise or counterclockwise fashion by a rotating motor and a driving gear. Each of the first and second coil springs are adapted to be alternately tightened and loosened by said pulley and said cam, respectively, wherein when a first one of said springs is tightened it is adapted to drive said pulley, when a second one of said springs is tightened it is adapted to drive said cam, and when said springs are loosened they remain idle and will not drive either said pulley or said cam.

The forcing disk comprises a stop which is adapted to extend into an opening on said cam and against said spring-loaded steel ball, wherein said stop is adapted to engage said steel ball and force said cam to advance in the same rotational direction as said rotary cup when said rotary cup rotates in a clockwise direction, wherein when said rotary cup rotates in a counterclockwise direction, said steel ball will disengage from said cam and prevent said cam from rotating, thereby comprising means for maintaining said third gear in a stationary position.

The advancement assembly further comprises a retracting device including a first pulley which is adapted to drive a second pulley in said driving mechanism, wherein when said second pulley is rotatably driven, said forcing disk, which is mounted along a common axle with said first pulley, comprises means for transmitting rotational force to said cam via said steel ball and said coil spring and for driving said third gear to rotate in the same direction as said second pulley, wherein said rotary cup is disengaged from said steel ball and remains stationary.

The advancement adjustment mechanism further comprises a guiding slot plate having first and second slots, said guiding slot plate adapted to be mounted on said first frame, wherein said first slot of said guiding slot plate comprises means for receiving a pivot on said connecting arm, said lower slot comprising means for receiving an extending pin on a said head positioned in a slot on the first frame, and an adjustment bolt comprising means for adjustably positioning said head within said lower slot, wherein said adjustment bolt further comprises means for changing the position of said pivot within said upper slot and the angular swinging amplitude of said guide slot plate.

The pressing board comprises a plurality of magnets which comprise means for controlling advancement of said pressing board and retracting said pressing board by activating respective magnetic reed switches, and further comprises an adjustable page space controller comprising at least one of said magnets, wherein the position of said page space controller comprises means for varying the travelling distance of said pressing board. The speed-reading trainer further comprises an electronic control circuit including a first variable resistor which is adapted to control the rotational speed of said electric motor, and a pause circuit which comprises an SPDT (i.e., a single-pole, double-throw) switch, a resistor, an LED, and a relay. When the SPDT is switched into a reverse rotational position, said electronic control circuit comprises at least two bi-stable circuits, wherein one transistor and at least one of said bi-stable circuits will remain in a high potential state, wherein at least one of the transistors and one of said bi-stable circuits will remain in a low potential state such that said electronic control circuit will rotatably drive said motor in a reverse direction. When the SPDT switch reaches a predetermined switching position, a relay will be energized to cut off power to a motor power circuit and said speed-reading trainer to effect lighting of said LED and at least temporarily stop motion of said speed-reading trainer.

In another aspect, the present invention provides a speed-reading trainer comprising a housing which comprises opposed first and second opposed frame members, an electronic control circuit mounted on said first frame member, a plurality of magnetic switches mounted on an inner surface of said first frame member, a viewing window adapted to be positioned over one or more lines of text in a book at a given time, said window being mounted for transverse movement with respect to said housing, a driving assembly mounted between said first and second frames, an advancement assembly adapted to be driven by said driving assembly and mounted between said first and second frame members, and means for adjusting said advancement assembly.

The control circuit unit is mounted on a top portion of said assembly and is electrically connected to at least one battery located in a compartment within said second frame member. The driving assembly comprises an electric motor, a first driving gear rotatably driven by said motor, a second, larger gear mounted on a separate axis from the axis on which said first gear is mounted and driven by said first gear, an eccentric cam on one side of said large gear adjacent to said first frame member. A first pulley is located on a side of said large gear adjacent to said second frame member, wherein each of said first pulley and said cam has a generally cylindrical axle tube positioned on an end of an axle on which a central aperture of said large gear is positioned. The first and second coiled springs are positioned on opposite ends of the large gear, wherein each of said springs has a free end attached to an aperture in said large gear.

When the large gear is rotated in a first direction, a first one of said springs tightens and the second of said springs loosens, wherein said spring which is tightened is adapted to drive said first pulley and the other of said springs will idle; and when the large gear is rotated in a second direction, the second one of said springs tightens and the first of said springs loosens, wherein said tightened spring drives said cam and said loosened spring remains idle, thereby not driving said first pulley.

The driving mechanism further comprises a rocker arm which includes a relatively small hole at a first end of said rocker arm and which receives a central circular portion on a second side of said cam along a second end of said rocker arm. The advancement mechanism comprises a connecting arm having a pivot at one end which is inserted within said rocker arm small hole, and a pin hole at a second end of said connecting arm. A guide plate has an upper curved slot and a lower curved slot, wherein said pivot is positioned within said upper curved slot, said pin hole is positioned about a cylindrical pin extending outwardly from a generally circular driving disk, wherein said connecting arm comprises means for changing reciprocating motion of said rocker arm into angular swinging motion of said driving disk. The advancement mechanism further comprises a generally circular forcing disk attached to a central aperture on said driving disk, said forcing disk including an elongated axle which is transverse to said driving disk and a generally radially arranged stop flange located along the periphery of said disk, a generally circular cam being attached to said transverse axle, and a coiled spring and steel ball which are positioned within a hole on said cam surface, wherein said stop extends into an opening in said cam and is adapted to selectively engage said steel ball. A rotary cup has a substantially flat, circular base and an upstanding peripheral flange surrounding said base; the cup is adapted to encase said cam, and is rotatable in both counterclockwise and clockwise directions, wherein when the rotary cup rotates in a clockwise direction, said steel ball engages said cam and advances said cam in the direction of motion of said rotary cup, and when the rotary cup swings in a counterclockwise direction, the steel ball is disengaged from said cam and comprises means for preventing said cam from swinging, thereby maintaining an axle tube which is located on said cam in a stationary position and permitting a third, large gear which is coaxially positioned with respect to the cam to advance intermittently in a given direction.

The advancement mechanism further comprises a retraction device in the form of a second pulley attached to said first pulley, said second pulley being coaxial with said third gear, wherein rotation of said first pulley drives said second pulley and causes said third gear to rotate, and said rotary cup to be disengaged by said ball and remain stationary. It also includes a guide plate and a head extending outwardly from an elongated slot on said first frame member, wherein a reduced diameter pin on said head extends into said elongated slot on said first frame member; and the adjustment mechanism further comprises an adjustment bolt extending transversely through a central bore in the head. The said head pin extends through said lower arcuate slot of said guide plate and thereby comprises means for adjusting the angular swing amplitude of said connecting arm.

A pressing board is transversely connected to a viewing window and extends under said housing, said pressing board including a spline engaging said third gear and adapted to be selectively driven in two directions by said third gear to move said window over a predetermined distance and/or at predetermined times. The pressing board further comprises magnets adapted to be activated by magnetic switches, wherein one of said magnets is located on a position adjustable page space controller attached to said pressing board and positioned within a guide rail extending upwardly from an upper surface of said pressing board. The electronic control circuit comprises at least one variable resistor which comprises means for controlling the rotational speed of said electric motor, and a pause circuit including a relay, a resistor, an LED, and an SPDT switch.

BRIEF DESCRIPTION OF THE DRAWINGS

The above and other objects, features and advantages of the present invention will be more fully described with respect to the detailed drawings which are attached hereto, in which like reference numerals represent similar parts throughout the several views, and wherein.

DETAILED DESCRIPTION OF THE INVENTION

Figure 1:
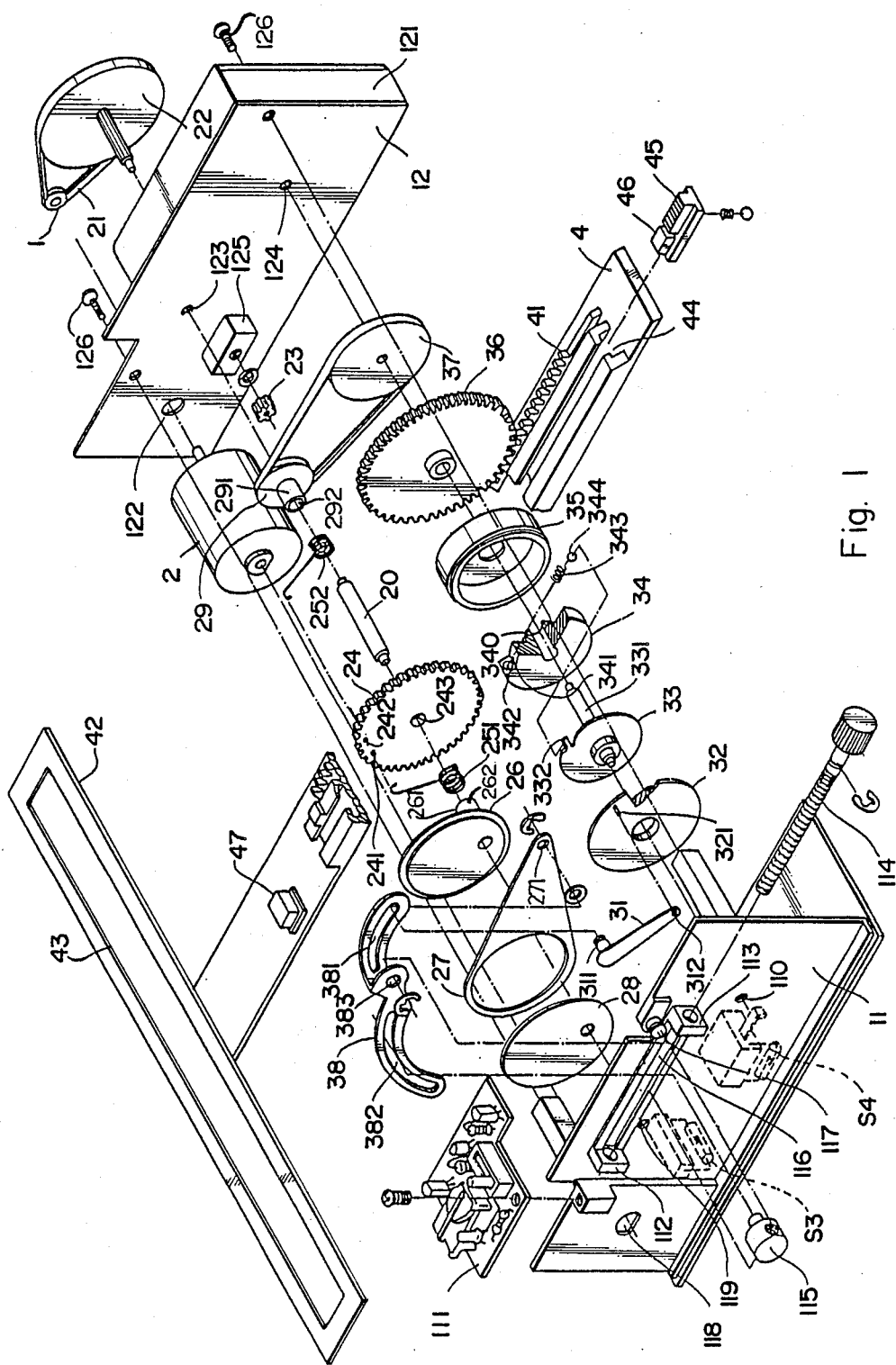
FIG. 1 is an exploded perspective view of a first embodiment of an automatic speed-reading trainer formed in accordance with the present invention.

Referring more specifically to FIG. 1, the present invention comprises an encased assembly (which is shown in partial cut-away view and which does not include the remainder of the conventional exterior housing) which includes a left frame member 11 and a right frame member 12 which form the two ends of the integrated structure. An electric motor 2 is provided which drives a driving unit; and the apparatus further comprises an advancement assembly driven by the driving unit, an adjustment mechanism for adjusting the distance over which the structure is advanced, and a circuit control unit.

The left frame receives the control circuit unit 111, magnetic switches S3 and S4, and support seats 112 and 113, which are adapted to support an adjustment bolt 114 and a head 115 which is screwed onto the adjustment bolt. Specifically, head 115 is positioned within elongated slot 116 on the framework, and includes an (unreferenced) aperture for receiving adjustment bolt 114 so that when the position of the adjustment bolt 114 is varied, the head which is screwed onto the adjustment bolt will be variably moved in a linear fashion. Further, an electric motor mounting aperture 118 is provided along one side of the left frame member 11, which is utilized to install one end of electric motor 2. Furthermore, two axle holes 119 and 110 are provided on the left-hand frame to receive, respectively, respective axles of the driving unit and the advancement mechanism.

The right-hand framework 112 comprises a battery compartment 121 which is used to house a set of replaceable batteries, and a control circuit for the batteries. The frame also includes an axle hole 122 to receive an end or axle of the electric motor 2, and axle holes 123 and 124 which are adapted to receive, respectively, in an installed fashion, respective axles of the driving unit and the advancement mechanism, in a similar fashion to the manner in which opposite ends of the axles of the driving unit and advancement mechanism are received by axle holes 119 and 110. This framework also includes a base block 125 which is adapted to receive pulley 22 and active driving gear 23. Additionally, two bolts or screws 126 are provided to tighten the left frame 11 to the right-hand frame 12 via the generally rectangular blocks (unreferenced) which are internally threaded and which extend inwardly from frame 11 as best illustrated in FIG. 1.

The driving unit or mechanism for the present invention comprises an electric motor 2 which is adapted to furnish driving force to the system. The driving force provided by the motor 2 drives the active or driving gear 23, which is mounted on the axle of pulley 22, which is positioned on the exterior side of right frame 12. The active gear 23 also serves to drive the larger gear 24, which is provided with holes 241 and 242.

These holes are used to receive respective ends of the left coiled spring 251 and the right coiled spring 252, respectively. The larger gear 24 is mounted on axle 20 via its axle hole 243. A pulley 29 is mounted on the opposite end of the same axle, with the right coil spring 252 positioned between a second end of the axle and axle 291 of pulley 29. An eccentric cam 26, rocker arm 27, and eccentric disk 28 are also mounted on the first end of the axle 20, with the large gear 24 positioned between the first end of the axle and the left coil spring. The eccentric cam 26 is mounted adjacent to the left coil spring and the rocker arm 27 is mounted adjacent to the eccentric cam 26, with eccentric disk 28 mounted adjacent rocker arm 27 on the side opposite from cam 26. Right coil spring 252 is mounted over axle 291 of pulley 29, with one end of this spring adapted to be fitted into round hole 292 of axle tube 291. The other end of the axle 20 is fitted into round hole 243 of larger gear 24, with left coil spring 251 mounted over axle tube 261 of eccentric cam 26. One end of the coil spring is fitted into the round hole 262 of axle tube 261, and the other end of the spring is fitted into round hole 241 of larger gear 24. The rocker arm 27 is mounted between the eccentric cam 26 and eccentric plate 28 and is utilized to change or convert the circular rotational motion of the large gear into reciprocating motion.

The movement assembly of the driving unit will now be explained in detail. When electric motor 2 rotates in a counterclockwise direction, large gear 24 will be driven to rotate in a clockwise direction. In this fashion, the left coil spring 251 will be tightened, and will thereby drive eccentric cam 26 and eccentric disk 28 to rotate; because rocker arm 271 is mounted between the eccentric cam and the eccentric disk, the circular motion is converted into reciprocating motion. Further, at this time, the right coil spring 252 remains substantially loose, and will not drive pulley 29 in a rotating fashion, i.e., it will idle. To the contrary, if electric motor 2 rotates in a clockwise direction, larger gear 24 will be driven to rotate in a counterclockwise direction; at such time, the right coil spring 252 will be tightened, thereby driving pulley 29 and pulley 37 to rotate in a counterclockwise direction. Further, at this time, the left coil spring 251 will remain in a substantially loose state, i.e., it will idle, and thereby no movement of eccentric cam 26 and the rocker arm will develop.

The advancement mechanism of the apparatus will now be described. The advancement mechanism uses rocker arm 27 to change rotational circular motion into intermittent reciprocating motion. This advancement mechanism includes connecting arm 31, driving disk 32, forcing disk 33, cam 34, rotary cup 35, gear 36, pulley 37, and guiding slot plate 38.

Connecting arm 31 includes a pivot 311 passing through slot 381 of guiding slot plate 38. This arm is connected to pivot hole 271 of rocker arm 27. Pin hole 312 of connecting arm 31 is connected to pin 321 of driving disk 32. As a result, when rocker arm 27 is driven to move, connecting arm 31 will change the movement of the arm into a reciprocating motion to drive driving disk 32. This reciprocating motion is further changed into intermittent motion after it passes through forcing disk 33 and cam 34. Driving disk 32 is positioned or encased within rotary cup 35, and forcing disk 33 and cam 34 are also mounted between the driving disk and the rotary cup. As a result, when reciprocating motion is applied to driving disk 32 by rocker arm 27 and connecting arm 31, it will drive rotary cup 35 to rotate on the same axle or axis with the same amount of angular movement.

Forcing disk 33 and cam 34 are also encased within rotary cup 35. The forcing disk is provided with an axle 331, which is used for installing or receiving all of the advancement components in the space or area between left frame member 11 and right frame member 12. A stop 332 is provided on the forcing disk 33 which is adapted to extend into opening 341 of cam 34. Further, a round hole 342 is provided on cam 34 which is used to receive a coil spring 343 and a steel ball 334. As a result of this structure, the coil spring 343 will exert compressive force on the steel ball 344 by forcing the ball to rest against stop 332 of forcing disk 33.

Figure 2:
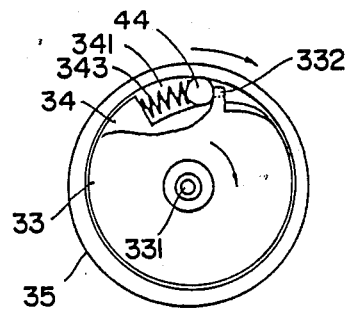
FIG. 2 is a plan view of a first position of a forcing disk used in the apparatus of FIG. 1.
Figure 3:
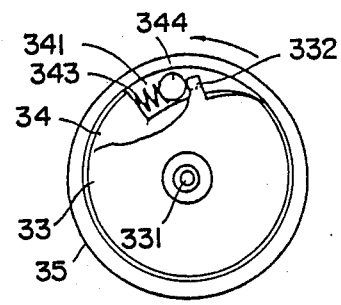
FIG. 3 is a plan view of a second position of the forcing disk illustrated in FIG. 2.

With more specific reference to FIG. 2, when rotary cup 35 rotates in a clockwise direction, steel ball 344 will engage the rotary cup 35 and cam 34 and will cause cam 34 to rotate in the same direction. This will, in turn, drive gear 36, on axle tube 340 of cam 34, to rotate in a clockwise direction. Further, when driving disk 32 is driven by connecting arm 34 to rotate in a counterclockwise direction, as illustrated in FIG. 3, steel ball 334 will become disengaged from its position between rotating cup 35 and cam 34; in other words, the steel ball will break off its contact with rotary cup 35, and at this time, rotary cup 35 will rotate freely in a counterclockwise direction about axle 331. Axle 331 will not, however, rotate, and as a result gear 36 will remain: in a stationary position, i.e., gear 36 will be rotated in an intermittent fashion.

Figure 4:
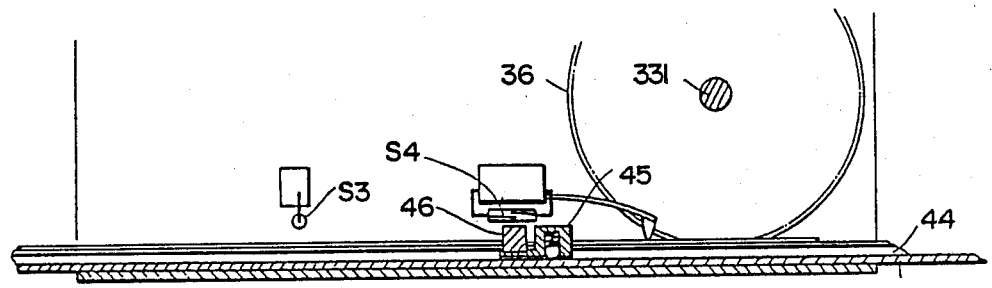
FIG. 4 is a plan view of a first position of a spline driven by a gear in the apparatus of FIG. 1.
Figure 5:
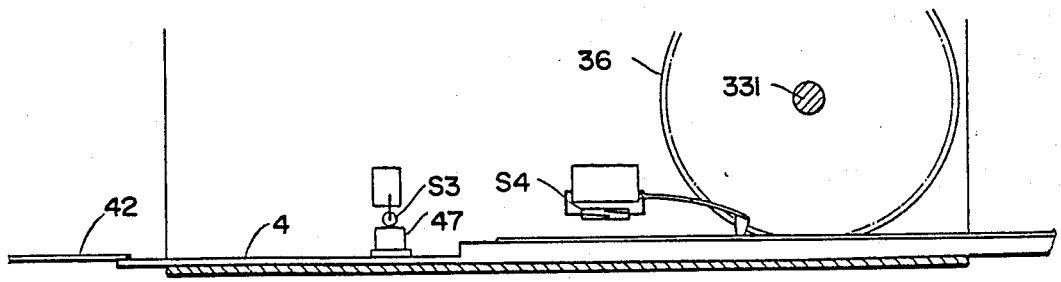
FIG. 5 is a second position of the spline of FIG. 4.
Figure 6:
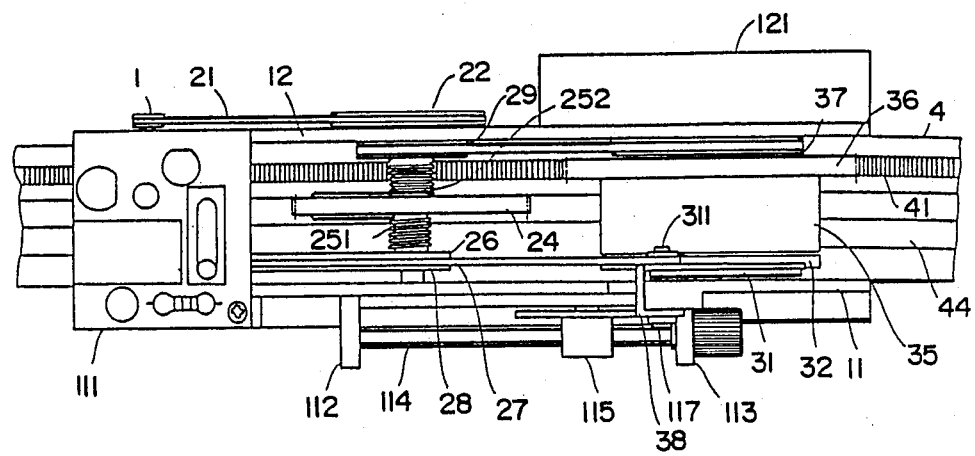
FIG. 6 is a top view of the apparatus of FIG. 1.
Figure 7:
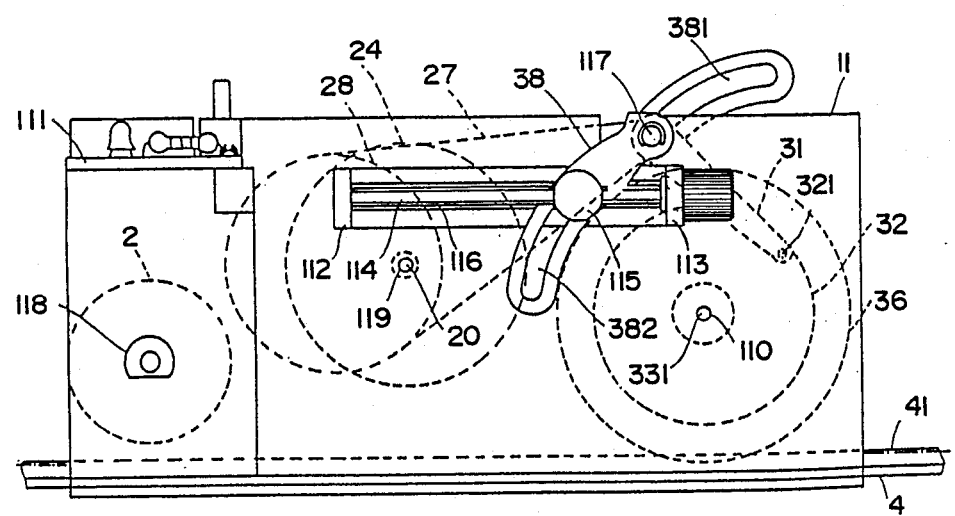
FIG. 7 is a front plan view of the left frame of the apparatus of FIG. 1.
Figure 8:
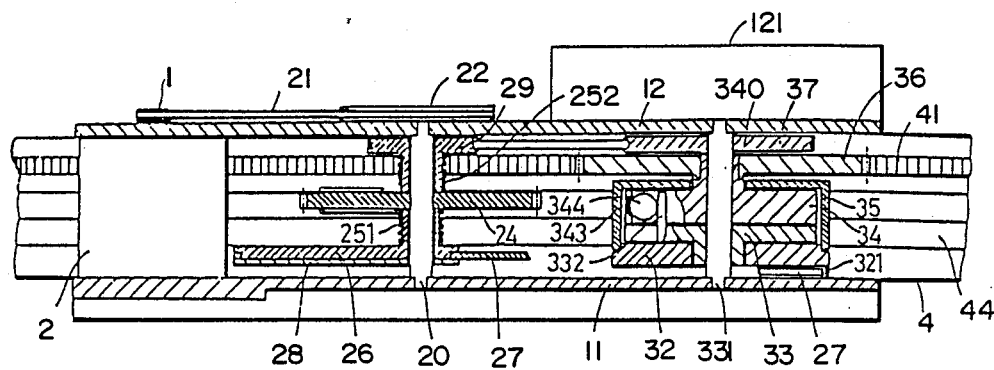
FIG. 8 is a top sectional view of the structure of FIG. 1.

Because pulley 37 is fixedly positioned on axle 331 of forcing disk 33, when gear 36 is intermittently rotated in a clockwise direction, the driving force will be much smaller than the engagement force of the steel ball 344 which is located between rotary cup 35 and cam 34. Pulley 29 will also drive forcing disk 33 to rotate in the same direction, because pulley 37 is fixedly secured on the axle of forcing disk 33. The length, elasticity, number of turns, and tightness of coil springs 251 and 252 can be determined by experimentation and design examples, and therefore does not independently form a portion of the present invention. Gear 36 is engaged on spline 41 of pressing board 4, and the pressing board is provided with a covering board 42. The covering board is used to press on the page of a book, and is provided with a viewing window 43 or a front edge for displaying given lines of text on a page. In addition to spline 41, pressing board 4 is provided with a guiding rail 44 for installing and receiving the page space control member 45. This member can be adjusted and set to any desired position along guiding rail 44; and a magnet 46 is provided on page space controller 45 to control the electric motor 2 in the reverse direction. FIGS. 4 and 5 illustrate how pressing board 4 is driven to move by gear 36.

Figure 9:
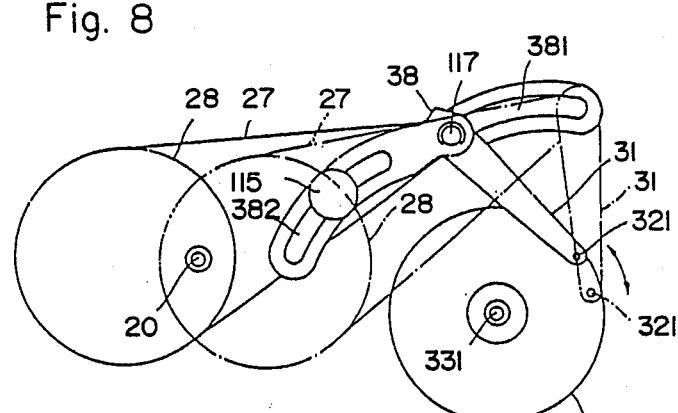
FIG. 9 is a plan view illustrating an advancement mechanism forming a portion of the apparatus of FIG. 1, shown in a first position.
Figure 10:
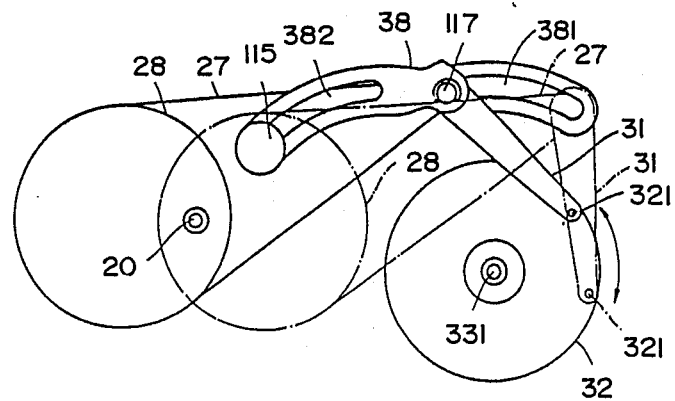
FIG. 10 is a plan view of a second position of the advancement mechanism of FIG. 9.

The advancement distance adjusting mechanism will now be described in detail. Referring specifically to FIGS. 1, 6, 7, and 8, it can be seen that axle hole 383 of guiding slot plate 38 is adapted to be mounted on axle pin 117 of left frame 11. Guiding slot plate 38 is provided with two slots 381 and 382, with slot 381 being utilized for passing pivot 311 of connecting arm 31 therethrough, and slot 382 being utilized for passing pin-shaped end of head 115 therethrough. When rocker arm 27 is driven to move by eccentric cam 26, pivot 311 of connecting arm 31 will be forced to have a reciprocating movement within slot 381. This movement, via the pivotal connection of pin hole 312 on the lower end of connecting arm 31, is transformed into angular reciprocating swinging movement of driving disk 32, as illustrated in FIGS. 9 and 10. This swinging movement is further transformed, into text line advancing movement of pressing board 4, via intermittent rotation of gear 36. The precise distance of the text line advancement can be adjusted by adjustment bolt 114; when this bolt is adjusted, the position of head 115 in slot 382 will be varied. Specifically, as shown in FIGS. 9 and 10, if head 115 is adjusted so that it is located at the bottom end of slot 382, the distance of movement of connecting arm 31 will gradually increase, whereas if head 115 is adjusted away from the bottom edge of slot 382, the distance of movement of connecting arm 31 will gradually decrease.

Figure 11:
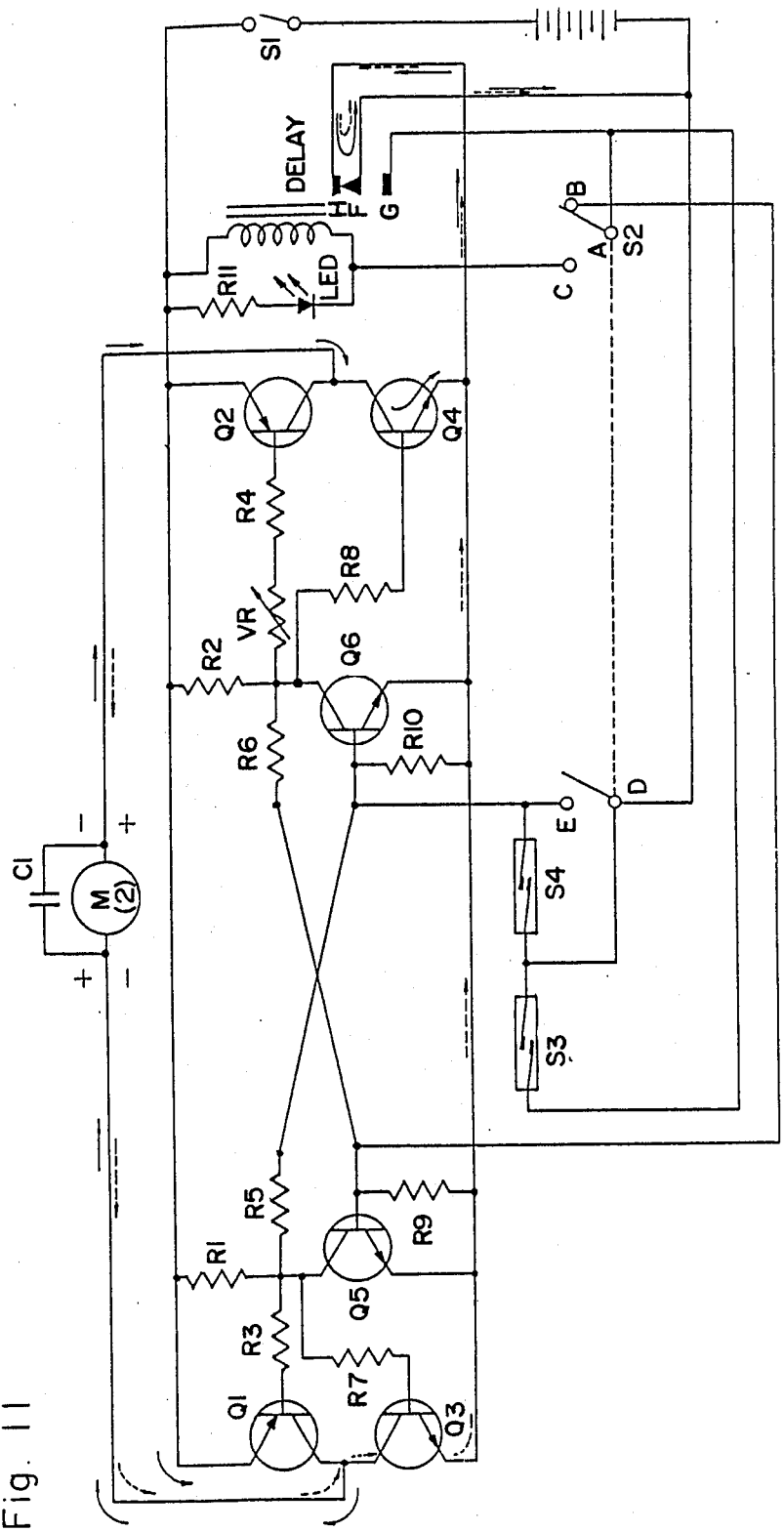
FIG. 11 is an electronic control circuit diagram.

The electronic control circuit of the present apparatus will now be more specifically described. With specific reference now to FIG. 11, electronic control circuit of the present invention will be described. It comprises a plurality of transistors Q1, Q2, Q3, Q4, Q5 and Q6, a power switch S1, a pause selection switch S2, magnetic reed switches S3 and S4, and a relay for the major components. Transistors Q5 and Q6 comprise a bi-stable circuit, and the relay is connected in parallel with an LED. Motor 2 is connected between the collectors of transistors Q1 and Q2. When the present invention is to be used, the first step is to turn power switch S1 to the ON position; at this time, assuming that the pressing board 4 is in its retracted position, and magnet 47 is positioned directly beneath magnetic reed switch S3, the magnet 47 will turn the magnetic reed switch S3 to the ON position by attracting the reed of switch S3 to close. When the magnetic reed switch S3 is turned to its ON position, the base of transistor Q5 is connected to the low potential side, and as a result Q5 will be turned to the OFF position. When the base of Q6 is connected to the high potential side, Q6 will be turned to its ON position. When Q5 is turned to the OFF position, Q3 will be turned to the ON position, and Q1 will be turned to the OFF position. When Q6 is turned to the ON position, Q2 will also be turned to the ON position, and Q4 will be turned to the OFF position. At this time, Q2, motor 2 and Q3 will complete an electric circuit, and will drive the motor to rotate in a counterclockwise direction. This rotational force of the motor further drives pressing board 4 to effect a downward, advancing motion. When this motion of pressing board 4 terminates, magnet 46 will be positioned directly beneath magnetic reed switch S4, and will turn S4 to its ON position by attracting the reed of switch S4 to close.

When switch S4 is turned to the ON position, the base of transistor Q6 will be connected to the low potential side, and Q6 will thereby be turned to its OFF position. Accordingly, when the base of Q5 is connected to the high potential side, Q5 will be turned to the ON position. When Q6 is turned into its OFF position, Q4 will be turned ON, and Q2 will be turned OFF. While Q5 is turned to its ON position, Q1 will be turned to its ON position, and Q2 will be turned to OFF. At this time, Q1, motor 2 and Q4 complete an electric circuit, and will drive motor 2 to rotate in a clockwise direction. This rotational force of the motor will drive pressing board 4 to produce a retracting motion. When the retracting movement of pressing board 4 terminates, magnet 47 will be positioned directly beneath magnetic reed switch S3, thereby turning S3 to ON and starting another cycle of motion.

If a pause is necessary, a pause selector switch S2 can be used. When S2 is actuated, contact points A-C and A-E are respectively connected together (at this point, the connection between contact points A-C will be broken), and the base of transistor Q6 will be connected to the low potential side. Accordingly, Q6 will be turned into is OFF position, and motor 2 will be driven to rotate in the reverse direction, which drives pressing board 4 to produce a retracting motion. When the pressing board is retracted to a position in which magnet 47 is directly beneath magnetic reed switch S3, switch S3 is turned into its ON position, thereby connecting the negative side of the battery, via contacts A-C, to the relay to complete an electric circuit. This drives the relay to work and the LED to light. At this time, relay contact F breaks off the connection with contact point H, and makes connection with contact point G, thereby disconnecting power from motor 2. The motor thus stops rotating, and at this time contacts F-G, rather than magnetic reed switch S3, will maintain the relay so that it will be continuously connected to the negative side of the battery. This, in turn, maintains the relay in an energized fashion and the motor 2 in a stationary position.

After pausing, if recovery to normal operation of the device is required, switch S2 is turned back into its original position. In this position, contact points A-C are connected together, and contact F of the relay will return to a normal connection with contact H. At this time, normal operation of the device will return.

The apparatus uses a variable resistor VR to change the rotational speed of motor 2. As a result, adjusting the reading speed in a non-step fashion can be served, because pressing board 4 will be automatically advanced over the page of a book. This will arouse the attention of the trainee or user, resulting in more effort being placed into use of the device. As a result, both time savings and knowledge acquisition will be simultaneously achieved. With such increase in speed-reading skills, knowledge and living quality will be promoted.

Although the present invention has been described with respect to specific embodiments herein, it is clearly contemplated that changes in specific features which would be within the skill of those of ordinary skill in the art are contemplated herein, and are within the scope of the appended claims.

What is claimed is:

1. A fully automatic speed-reading trainer which comprises:
   (a) a housing having at least two opposed frames, a first left-hand frame, and a second, right-hand frame;
   (b) a control circuit assembly mounted on said first frame;
   (c) a plurality of magnetic switches mounted on said first frame;
   (d) a battery compartment positioned within said second frame; and
   (e) a driving assembly, an advancement assembly, and an advancement adjustment assembly, wherein said driving assembly comprises means for rotating said advancement assembly to drive a viewing window attached to the housing in a generally linear fashion, said driving assembly further comprising an electric motor, a first, driving gear rotatably driven by said electric motor and a second, larger gear mounted on a first axle and adapted to be driven by said driving gear, wherein an eccentric cam and a first pulley are attached to said axle on opposite sides of said larger gear, each of said eccentric cam and said pulley comprising an axle tube adapted to fit over respective ends of said axle, said trainer further comprising first and second coiled springs mounted over respective ones of said axle tubes, each of said coiled springs having a free end adapted to be inserted into respective holes located on a flat surface of said larger gear, wherein when said larger gear is rotatably driven in either a clockwise or a counterclockwise direction, one of said eccentric cam and pulley will be rotatably driven by the tightening action of one of said springs.

2. A speed-reading trainer in accordance with claim 1 wherein said magnetic switches comprise magnetic reed switches.

3. A speed-reading trainer in accordance with claim 1, further comprising a rocker arm positioned adjacent to and attached to said eccentric cam, wherein rotary movement of said eccentric cam is transformed into reciprocating motion by said rocker arm, wherein said rocker arm generated reciprocating movement to drive said advancement assembly to rotate in a clockwise direction, wherein said pulley drives said advancement mechanism to rotate in a counterclockwise direction.

4. A speed-reading trainer in accordance with claim 1, wherein each of said first and second coil springs are adapted to be alternately tightened and loosened by said pulley and said cam, respectively, wherein when a first one of said springs is tightened it drives said pulley, when a second one of said springs is tightened it drives said cam, and when said springs are loosened they remain in idle and will not drive either said pulley or said cam.

5. A speed-reading trainer in accordance with claim 1, further comprising an electronic control circuit including a first variable resistor which is adapted to control the rotational speed of said electric motor, and a pause circuit which comprises an SPDT switch, a resistor, an LED, and a relay.

6. A speed-reading trainer in accordance with claim 1, wherein when said SPDT switch is switched into a reverse rotational position, said electronic control circuit comprises at least two-bi-stable circuits, wherein one transistor and at least one of said bi-stable circuits will remain in a high potential state, wherein at least one of the transistors in one of said bi-stable circuits will remain in a low potential state such that said electronic control circuit will rotatably drive said motor in a reverse direction.

7. A speed-reading trainer in accordance with claim 6, wherein when said SPDT switch reaches a predetermined switching position, a relay will be energized to cut off power to a ;motor power circuit and said speed-reading trainer to effect lighting of said LED and at least temporarily stop motion of said speed-reading trainer.

8. A fully automatic speed-reading trainer which comprises:
(a) a housing having at least two opposed frames, a first, left-hand frame, and a second, right-hand frame;
(b) a control circuit assembly mounted on said first frame;
(c) a plurality of magnetic switches mounted on said first frame;
(d) a battery compartment positioned within said second frame; and
(e) a driving assembly, an advancement assembly, and an advancement adjustment assembly, wherein said driving assembly comprises means for rotating said advancement assembly to drive a viewing window attached to the housing in a generally linear fashion, said trainer further comprising a connecting arm for attaching said driving assembly and said advancement assembly to each other, said connecting arm comprising a pivot at one end which is mounted in a pivot hole on a rocker arm, said connecting arm further comprising a pin hole at a second end thereof, said pin hole adapted to be mounted on a pin extending toward said first frame from a driving disk forming a portion of said advancement assembly, wherein reciprocating motion of said rocker arm drives said driving disk and a co-axial rotary cup having a central aperture, to swing with a predetermined angular amplitude.

9. A speed-reading trainer in accordance with claim 7, wherein said advancement mechanism further comprises a coil spring and a steel ball biased by said coil spring which is adapted to selectively engage a cam which is attached to a generally transversely extending axle on a forcing disk positioned between said rotary cup and said driving disk, said spring-loaded steel ball comprising means for transforming said swinging motion of aid rotary cup into an intermittent single directional motion, said single directional motion adapted to drive a third gear which is attached to and coaxial with said rotary cup, said cam, said forcing disk and said driving disk, intermittently, in a single direction.

10. A speed-reading trainer in accordance with claim 9, wherein said forcing disk comprises a stop which is adapted to extend into an opening on said cam and against said spring-laded steel ball, wherein said stop is adapted to engage said steel ball and force aid cam to advance in the same rotational direction as said rotary cup when said rotary cup rotates in a clockwise direction, wherein when said rotary cup rotates in a counterclockwise direction, said steel ball will disengage from said cam and prevent said cam from rotating, thereby comprising means for maintaining said third gear in a stationary position.

11. A speed-reading trainer in accordance with claim 10, wherein said advancement assembly further comprises a retracting device including a first pulley which is adapted to drive a second pulley in said driving mechanism, wherein when said second pulley is rotatably driven, said forcing disk, which is mounted along a common axle with said first pulley, comprises means for transmitting rotational force to said cam via said steel ball and said coil spring and for driving said third gear to rotate in the same direction as said second pulley, wherein said rotary cup is disengaged from said steel ball and remains stationary.

12. A speed-reading trainer in accordance with claim 9, wherein said advancement adjustment mechanism further comprises a guiding slot plate having first and second slots, said guiding slot plate adapted to be mounted on said first frame, wherein said first slot of said guiding slot plate comprises means for receiving a pivot on said connecting arm, said lower slot comprising means for receiving an extending pin on a head positioned; in a slot on said first frame, and an adjustment bolt comprising means for adjustably positioning said head within said lower slot, wherein said adjustment bolt further comprises means for changing the position of said pivot within said upper slot and the angular swinging amplitude of said guide slot plate.

13. A speed-reading trainer in accordance with claim 7, wherein said driving assembly is adapted to be rotated in either a clockwise or counterclockwise fashion by a rotating motor and a driving gear.

14. A speed-reading trainer in accordance with claim 8, wherein said control circuit including a first variable resister which is adapted to control the rotational speed of said electric motor, and a pause circuit which comprises an SPDT switch, a resister, a LED, and a relay.

15. A speed-reading trainer in accordance with claim 14, wherein when said SPDT switch is switched into a reverse rotational position, said electronic control circuit comprises at least two bi-stable circuits, wherein one transistor and at least one of said bi-stable circuits will remain in a high potential state, wherein at least one of the transistors in one of said bi-stable circuits will remain in a low potential state such that said electronic control circuit will rotatably drive said motor in a reverse direction.

16. A speed-reading trainer in accordance with claim 15, wherein when said SPDT switch reaches a predetermined switching position, a relay will be energized to cut off power to a motor power circuit and said speed-reading trainer to effect lighting of said LED and at least temporarily stop motion of said speed-reading trainer.

17. A fully automatic speed-reading trainer which comprises:
(a) a housing having at least two opposed frames, a first, left-hand frame, and a second, right-hand frame;
(b) a control circuit assembly mounted on said first frame;
(c) a plurality of magnetic switches mounted on said first frame;
(d) a battery compartment positioned within said second frame; and
(e) a driving assembly, an advancement assembly, and an advancement adjustment assembly, wherein said driving assembly comprises means for rotating said advancement assembly to drive a viewing window attached to the housing in a generally linear fashion wherein said first frame comprises an elongated slot, an adjustment bolt being positioned substantially parallel to a flat surface of said frame member and parallel to said slot, said advancement adjustment assembly further comprising a head having a pin extending from one end thereof and a central aperture, said adjustment bolt adapted to be inserted through said aperture, wherein said adjustment bolt, when rotated, comprises means for changing the position of the head within said slot and for changing the position of said connecting arm in a slot on an arcuate guide slot plate, thereby comprising means for changing the advancement distance of said viewing window, said window being attached to said advancement mechanism.

18. A fully automatic speed-reading trainer in accordance with claim 9 further comprising a pressing board having a guide rail, said pressing board having a spline which is adapted to be driven by rotation of said third gear, wherein a cover plate having said viewing window attached thereto is transversely connected to one end of said pressing board and is adapted to cover lines of text in a book, wherein rotation of said third gear comprises means for driving said pressing board to advance said window over a predetermined distance of said text.

19. A speed-reading trainer in accordance with claim 10, wherein said pressing board comprises a plurality of magnets which comprise means for controlling advancement of said pressing board and retracting said pressing board by activating respective magnetic reed switches.

20. A speed-reading trainer in accordance with claim 16, wherein said pressing board further comprises an adjustable page space controller comprising at least one of said magnets, wherein the position of said page space controller comprises means for varying the travelling distance of said pressing board.

21. A speed-reading trainer in accordance with claim 9, further comprising an electronic control circuit including a first variable resister which is adapted to control the rotational speed of said electric motor, and a pause circuit which comprises an SPDT switch, a resistor, a LED and a relay.

22. A speed-reading trainer in accordance with claim 21, wherein when said SPDT switch is switched into a reverse rotational position, said electronic control circuit comprises at least two bi-stable circuits, wherein one transistor and at least one of said bi-stable circuits will remain in a high potential state, wherein at least one of the transistors in one of said bi-stable circuits will remain in a low potential state such that said electronic control circuit will rotatably drive said motor in a reverse direction.

23. A speed-reading trainer in accordance with claim 22, wherein when said SPDT switch reaches a predetermined switching position, a relay will be energized to cut off power to a motor power circuit and said speed-reading trainer to effect lighting of said LED and at least temporarily stop motion of said speed-reading trainer.

24. A speed-reading trainer in accordance with claim 17, wherein said driving assembly is adapted to be rotated in either a clockwise or counterclockwise fashion by a rotating motor and a driving gear.

25. A speed-reading trainer comprising:
(a) a housing which comprises opposed first and second frame members;
(b) an electronic control circuit mounted on said first frame member;
(c) a plurality of magnetic switches mounted on an inner surface of said first frame member;
(d) a viewing window adapted to be positioned over at least one line of text in a book at a given time, said window being mounted for transverse movement with respect to said housing;
(e) a driving assembly mounted between said first and second frames, said driving assembly comprising an electric motor, a first driving gear rotatably driven by said motor, a second, larger gear mounted on a separate axis from the axis on which said first gear is mounted and driven by said first gear, an eccentric cam on one side of said large gear adjacent to said first frame member, a first pulley being located on a side of said large gear adjacent to said second frame member, wherein each of said first pulley and said cam is a generally cylindrical axle tube positioned on an end of an axle on which a central aperture of said large gear is positioned, wherein said first and second coiled springs are positioned on opposite ends of said large gear, each of said springs having a free end attached to an aperture in said large gear;

(f) an advancement assembly adapted to be driven by said driving assembly and mounted between said first and second frame members; and (g) means for adjusting said advancement assembly.

26. A speed-reading trainer in accordance with claim 25, wherein said control circuit unit is mounted on a top portion of said assembly and is electrically connected to at least one battery located in a compartment within said second frame member.

27. A speed-reading trainer in accordance with claim 25, wherein when said large gear is rotated in a first direction, a first one of said springs tightens and the second of said springs loosens, wherein said spring which is tightened drives said first pulley and the other of said springs will idle.

28. A speed-reading trainer in accordance with claim 25, wherein when said large gear is rotated in a second direction, the second of said springs tightens and the first of said springs loosens, wherein said tightened spring drives said cam and said loosened spring remains idle, thereby not driving said first pulley.

29. A speed-reading trainer in accordance with claim 25, wherein said driving mechanism further comprises a rocker arm which includes a small hole at a first end of said rocker arm which receives a central circular portion on a second side of said cam along a second end of said rocker arm.

30. A speed-reading trainer in accordance with claim 29, wherein said advancement mechanism comprises a connecting arm having a pivot at one end which is inserted within said rocker arm small hole, and a pin hole at a second end of said connecting arm, and a guide plate having an upper curved slot and a lower curved slot, wherein said pivot is positioned within said upper curved slot, said pin hole is positioned about a cylindrical pin extending outwardly from a generally circular driving disk, wherein said connecting arm comprises means for changing reciprocating motion of said rocker arm into angular swinging motion of said driving disk, said advancement mechanism further comprises a generally circular forcing disk attached to a central aperture on said driving disk, said forcing disk including an elongated axle which is transverse to said driving disk and a generally radially arranged stop flange located along the periphery of said forcing disk, a generally circular cam being attached to said transverse axle, and a coiled spring and steel ball which are positioned within a hole on said cam surface, wherein said stop extends into an opening in said cam and is adapted to selectively engage said steel ball, a rotary cup with a substantially flat, circular base and an upstanding peripheral flange surrounding said base, said cup being adapted to encase said cam, wherein said rotary cup is rotatable in both counterclockwise and clockwise directions, wherein when said rotary cup rotates in a clockwise direction, said steel ball engages said cam and advances said cam in the direction of motion of said rotary cup, and when said rotary cup swings in a counterclockwise direction, said steel ball is disengaged from said cam and comprises means for preventing said cam from swinging, thereby maintaining an axle tube which is located on said cam in a stationary position and permitting a third, large gear which is coaxially positioned with respect to said cam to advance intermittently in a given direction.

31. A speed-reading trainer in accordance with claim 27, further comprising a retraction device having a second pulley attached to said first pulley, said second pulley being coaxial with said third gear, wherein rotation of said first pulley drives said second pulley and causes said third gear to rotate and said rotary cup to be disengaged by said ball to remain stationary.

32. A speed-reading trainer in accordance with claim 31, wherein said electronic control circuit comprises at least one variable resistor which comprises means for controlling the rotational speed of said electric motor, and a pause circuit including a relay, a resistor, an LED, and an SPDT switch.

33. A speed-reading trainer in accordance with claim 31, wherein said advancement adjustment mechanism comprises said guide plate and a head extending outwardly from an elongated slot on said first frame member, wherein a reduced diameter pin on said head extends into said elongated slot on said first frame member, said adjustment mechanism further comprising an adjustment bolt extending transversely through a central bore in said head, said head pin extending through said lower arcuate slot of said guide plate and thereby comprising means for adjusting the angular swing amplitude of said connecting arm.

34. A speed-reading trainer in accordance with claim 33, further comprising a pressing board which is transversely connected to said viewing window and which extends under said housing, said pressing board including a spline engaging said third gear and adapted to be selectively driven in two directions by said third gear to move said window over a predetermined distance and at a predetermined rate.

35. A speed-reading trainer in accordance with claim 34, wherein said pressing board further comprises magnets adapted to activate said magnetic switches, wherein one of said magnets is located on a position adjustable page space controller attached to said pressing board and positioned within a guide rail extending upwardly from an upper surface of said pressing board.

* * * * *